United States Patent

Maciocci et al.

(10) Patent No.: US 9,401,048 B2
(45) Date of Patent: Jul. 26, 2016

(54) METHODS AND APPARATUS FOR AUGMENTED REALITY TARGET DETECTION

(71) Applicant: QUALCOMM Incorporated, San Diego, CA (US)

(72) Inventors: Giuliano Maciocci, Cambridge (GB); Andrew J. Everitt, Cambridge (GB)

(73) Assignee: QUALCOMM INCORPORATED, San Diego, CA (US)

( * ) Notice: Subject to any disclaimer, the term of this patent is extended or adjusted under 35 U.S.C. 154(b) by 322 days.

(21) Appl. No.: 13/834,669

(22) Filed: Mar. 15, 2013

(65) Prior Publication Data

US 2014/0267403 A1    Sep. 18, 2014

(51) Int. Cl.
*G06T 19/00* (2011.01)
*G06F 3/01* (2006.01)
*G06F 3/03* (2006.01)
*H04N 5/232* (2006.01)

(52) U.S. Cl.
CPC .............. *G06T 19/006* (2013.01); *G06F 3/011* (2013.01); *G06F 3/017* (2013.01); *G06F 3/0304* (2013.01); *H04N 5/23245* (2013.01)

(58) Field of Classification Search
CPC .................. G06T 19/006; G06T 19/00; G06T 2207/10016
USPC ........................................................ 345/633
See application file for complete search history.

(56) References Cited

U.S. PATENT DOCUMENTS 8,203,605 B1    6/2012  Starner
8,698,843 B2 *  4/2014  Tseng ........................... 345/633
8,810,599 B1    8/2014  Tseng
9,219,901 B2    12/2015 Mulholland et al.
2007/0035562 A1 * 2/2007 Azuma et al. ................. 345/633
2011/0227812 A1  9/2011  Haddick et al.

(Continued)

FOREIGN PATENT DOCUMENTS

EP    1271293 A2    1/2003
EP    2423799 A1    2/2012

(Continued)

OTHER PUBLICATIONS

International Search Report and Written Opinion—PCT/US2014/026000—ISA/EPO—Aug. 12, 2014.

*Primary Examiner* — Ke Xiao
*Assistant Examiner* — Kim-Thanh T Tran
(74) *Attorney, Agent, or Firm* — Muncy, Geissler, Olds & Lowe, P.C.

(57) ABSTRACT

Systems and methods are disclosed for target-based AR devices to perform low-power front-end passive scanning of targets to alert users to AR content linked to any image targets the users may be viewing. Passive scanning by AR devices relieves users of the need to manually activate a camera for AR image target identification, and helps to identify image targets the users may be unknowingly viewing. To conserver power, AR devices may autonomously activate a camera to perform an exploratory scan when the AR devices detect from users' movement patterns that users may be interested in certain targets or is in a state of attentiveness. AR devices may identify one or more image targets from the exploratory scans. If users elect to interact with the AR content, AR devices may activate the camera to perform a full capture or real-time tracking of the image targets to augment the AR content.

49 Claims, 5 Drawing Sheets

(56) References Cited

U.S. PATENT DOCUMENTS

| | | | |
|---|---|---|---|
| 2011/0304648 A1* | 12/2011 | Kim et al. | 345/633 |
| 2012/0062729 A1* | 3/2012 | Hart et al. | 348/135 |
| 2012/0194549 A1* | 8/2012 | Osterhout et al. | 345/633 |
| 2012/0249741 A1 | 10/2012 | Maciocci et al. | |
| 2012/0249797 A1 | 10/2012 | Haddick et al. | |
| 2013/0006529 A1 | 1/2013 | Miyamoto | |

FOREIGN PATENT DOCUMENTS

| | | |
|---|---|---|
| GB | 2379354 A | 3/2003 |
| WO | 2012082807 A2 | 6/2012 |
| WO | 2013003414 A2 | 1/2013 |
| WO | 2013025354 A2 | 2/2013 |

* cited by examiner

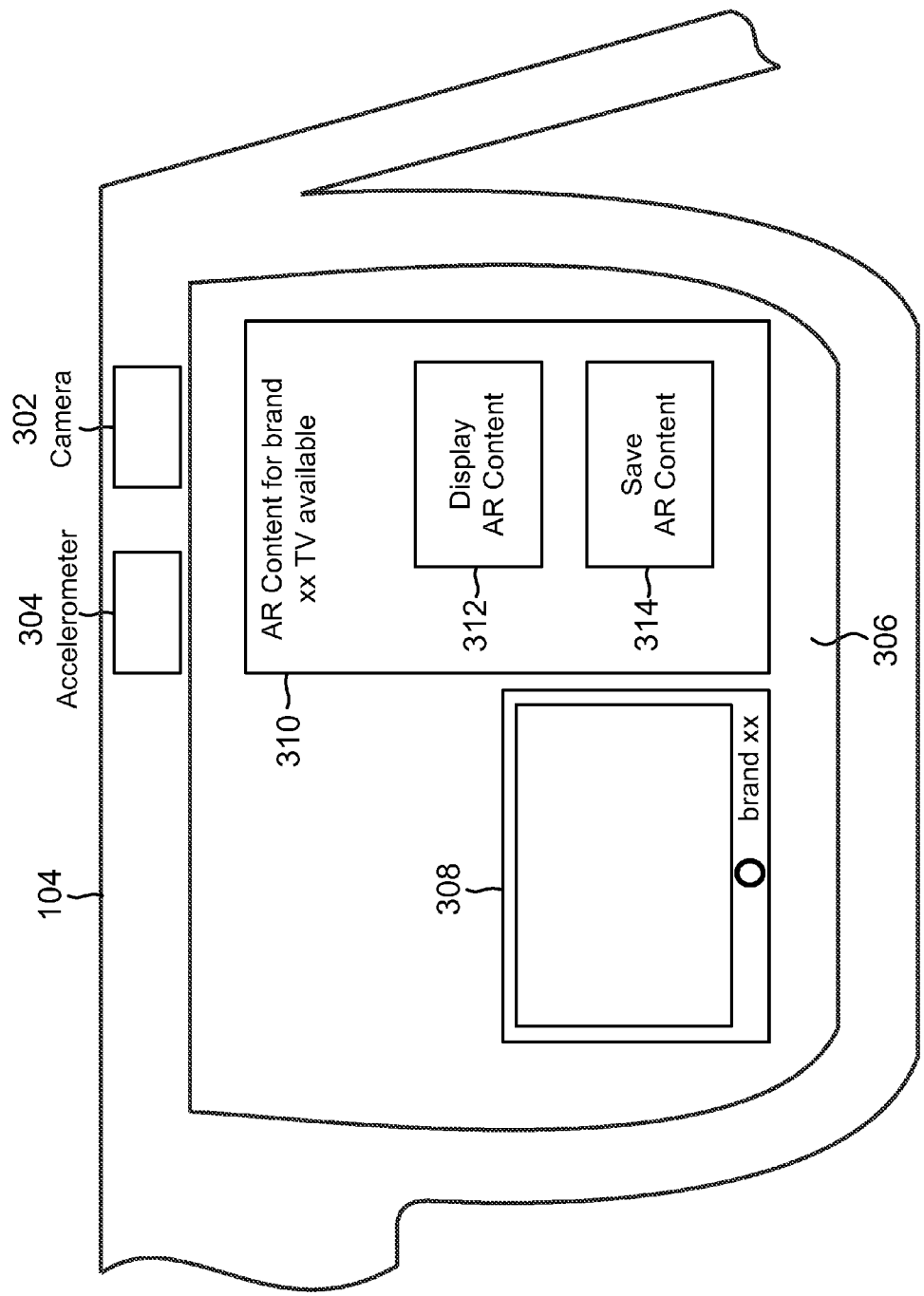

METHODS AND APPARATUS FOR AUGMENTED REALITY TARGET DETECTION

TECHNICAL FIELD

This application generally relates to user-worn computer systems. In particular, this application relates to methods and systems for scanning and identifying targets in augmented-reality (AR) devices.

BACKGROUND

Target-based augmented-reality (AR) devices allow users to view information linked to image targets identified by the devices in real time. One type of AR devices is a see-through head mounted display (HMD). A see-through HMD is a display device, worn on the head or as part of a helmet, in which computer generated images are projected on a partially reflective mirror to afford users a simultaneous real-world view. For example, a camera-enabled HMD worn by a shopper may identify image targets of products in the field of view of the shopper and may display to the shopper information on those products. Similarly, a body mounted camera worn by a user may track targets in the vicinity of the user and may display AR information on the targets to a smartphone linked to the camera for viewing by the user.

Conventionally, target-based AR is an active experience requiring participation from the users to identify image targets. For example, a user running an AR application on a target-based AR device typically points a camera at a target and activates the camera to scan the target. An image or fingerprint of the target is taken and compared against a device-based target database or a cloud-based target database for target identification. If there is a match, the target-based AR device retrieves AR content linked with the identified image target and renders the AR content on the screen of the AR device. One drawback of user-activated target identification is that unless AR image targets are clearly labeled as such, users do not know if the targets have AR content. In fact, the user is generally aware that the likelihood of any random target such as a random magazine cover, photo, poster, logo, or print advertisement having AR content linked to it is very small. Therefore, users may be discouraged from activating cameras to scan potential image targets.

Conversely, labeling AR image targets as such defeats the purpose of target-based AR because image labeling of targets then becomes another form of image-to-content linking such as QR codes. One way to free users from the need to activate image target identification is for camera-enabled HMDs or other user-worn camera systems to autonomously, continuously scan targets for identification of AR image targets. However, the power requirement for running the camera, communicating the image targets, and identifying the image targets on a continuous basis makes this solution unfeasible for HMDs and user-worn cameras with limited battery capacity. As such, there is a need for target-based AR devices to provide autonomous, low-power AR image target scanning and identification.

SUMMARY

Systems and methods are disclosed for target-based AR devices to perform low-power front-end passive scanning of targets to alert users to AR content linked to any image targets the users may be viewing. Passive scanning by AR devices relieves users of the need to manually activate a camera for AR image target identification, and helps to identify image targets the users may be unknowingly viewing. To conserve power, AR devices may autonomously activate a camera to perform an exploratory scan when the AR devices detect users' movement patterns suggesting that the users may be interested in certain targets or is in a state of attentiveness. AR devices may preliminarily identify one or more image targets from the exploratory scans. If users elect to interact with the AR content linked to the image targets, AR devices may activate the camera to perform a full capture or real-time tracking of the image targets to augment the AR content. Advantageously, users are relieved of the need to actively search for AR image targets. In addition, by activating a low-power exploratory scan of image targets upon detections of a user's movement patterns followed by a full capture when the user is ready for the AR experience, battery power of an AR device is conserved.

A method for an AR device to detect and display AR targets is disclosed. The method includes detecting by the AR device that the user is in a first state. Upon detecting such a state, the method includes capturing by the AR device a low resolution frame of the field of view of the user. The method further includes identifying from the low resolution frame an image target and determining that the image target has a linked AR content. The method further includes alerting the user that the image target is available. The method further includes receiving by the AR device a command from the user on whether the user wants to interact with the linked AR content. If the user wants to interact with the linked AR content, the method further includes capturing by the AR device a full resolution frame of the field of view of the user. The method further includes displaying by the AR device the linked AR content to the user.

An apparatus for AR target detection is disclosed. The apparatus includes a sensor used to register a motion of the apparatus, a camera, a memory, and one or more processors that are configured to detect and display AR targets. The processors are configured to poll the sensor to detect a movement pattern of the apparatus. Upon detecting such a movement pattern, the processors are also configured to activate the camera to capture a low resolution frame of a field of view of the camera. The processors are further configured to identify from the low resolution frame an image target and to determine that the image target has a linked AR content. The processors are further configured to alert the user that the image target is available. The processors are further configured to receive a command from the user on whether the user wants to interact with the linked AR content. If the user wants to interact with the linked AR content, The processors are further configured to activate the camera to capture a full resolution frame of the field of view of the camera.

A non-transitory machine-readable medium that stores machine-readable instructions is disclosed. One or more processors may execute the instructions to perform steps for detecting and displaying AR content. The instructions include detecting that a user is in a first state. The instructions also include capturing a low resolution frame of a field of view of the user upon detecting that the user is in the first state. The instructions further include identifying from the low resolution frame an image target and determining that the image target has a linked AR content. The instructions further include alerting the user that the image target is available. The instructions further include receiving a command from the user on whether the user wants to interact with the linked AR content. If the user wants to interact with the linked AR content, the instructions further include capturing a full resolution frame of the field of view of the user. The instructions further include providing the linked AR content to the user.

A system for detecting and displaying AR content is disclosed. The system includes means for detecting that a user is in a first state. The system also includes means for capturing a low resolution frame of a field of view of the user upon detecting that the user is in the first state. The system further includes means for identifying from the low resolution frame an image target and for determining that the image target has a linked AR content. The system further includes means for alerting the user that the image target is available. The system further includes means for receiving a command from the user on whether the user wants to interact with the linked AR content. If the user wants to interact with the linked AR content, the system further include means for capturing a full resolution frame of the field of view of the user. The system further includes means for providing the linked AR content to the user.

BRIEF DESCRIPTION OF THE DRAWINGS

FIG. 3 shows an exemplary field of view of a display of a HMD showing the availability of AR content for an image target according to one embodiment of the subject matter of the present disclosure.

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
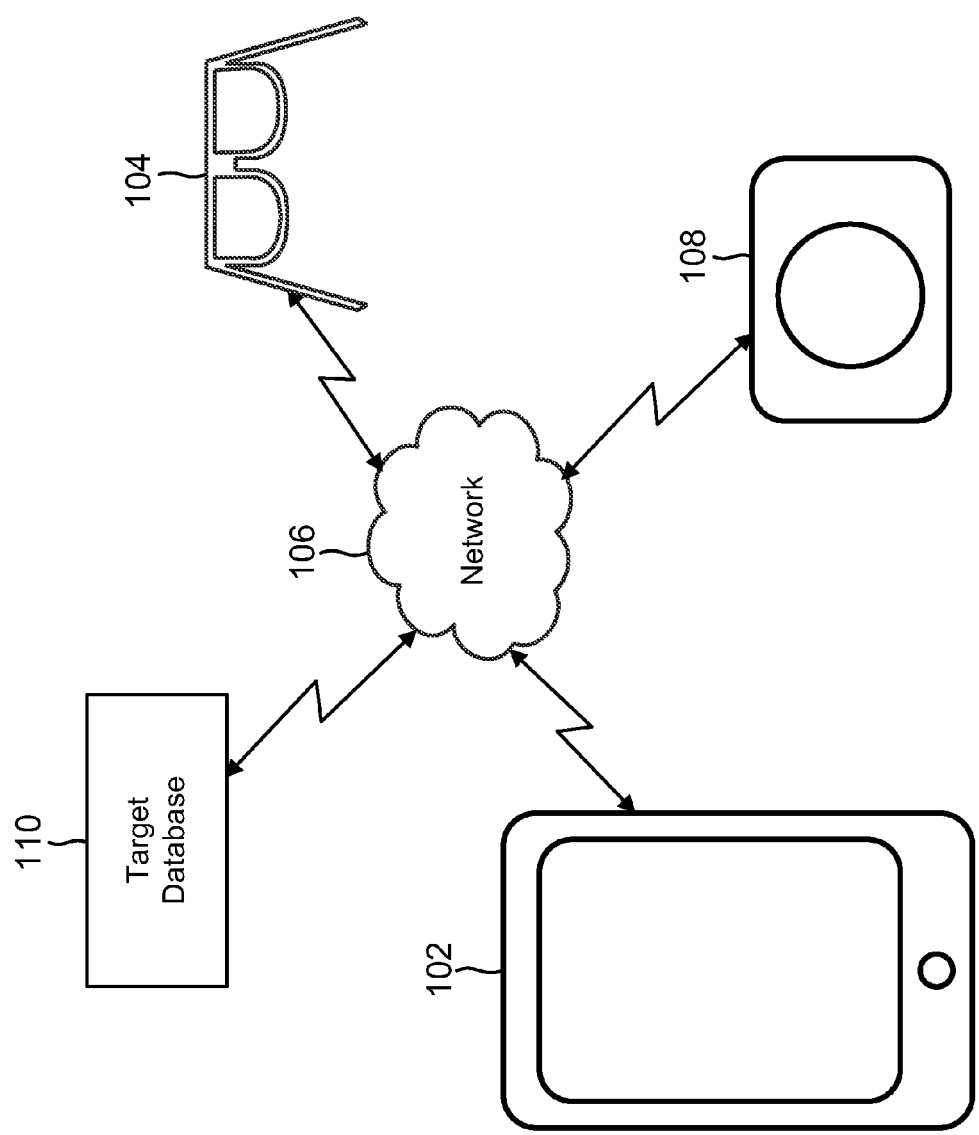
FIG. 1 shows a HMD or a body-worn camera connected to a mobile device used as a target-based AR device to scan image targets and display AR content according to one embodiment of the subject matter of the present disclosure.

Systems and methods are disclosed for target-based AR devices to perform low-power front-end passive scanning of targets to alert users to the existence of AR content linked to any image targets the users may be viewing, even targets the users may be unknowingly viewing. To conserver power, AR devices may activate the camera to perform exploratory scans when the AR devices detect motion movements suggesting that the users may be interested in certain targets or is in a state of attentiveness. After an image target is identified from the exploratory scans, the users may activate the camera to perform a full capture or real-time tracking of the image target to interact with the AR content linked to the image target.

AR devices may include a HMD or a body-worn camera connected to a mobile device. An accelerometer and/or gyro on the HMD or body-worn camera may be used to continuously track the head or body movement of a user wearing the HMD or the camera. The AR device may poll the accelerometer and/or gyro at periodic intervals to detect movement patterns. The patterns may include a pause of head movement after a period of motion. When the accelerometer and/or gyro register no significant movement across several polling events after a period of motion, such a movement pattern may suggest to the AR device that the user may be viewing or interested in certain targets. The AR device may activate the camera to capture a single low-resolution frame of targets or to track targets with a low-frame rate in the camera's field of view. The AR device may run an AR target-matching algorithm on the frame or frames to identify any image targets using a device-based target database. Alternatively, the AR device may transmit the frame or frames to a remote server for image target identification using a cloud-based target database.

If an image target is identified, and if the accelerometer and/or gyro have not detected movements of the head or body since the camera was activated, the AR device may alert the user that AR content is available either visually via the HMD or through haptic or audio alerts via the body-worn camera. In one or more embodiments, the connected mobile device may provide a haptic, audio, or video feedback to notify the user of the availability of the AR content. The user has the option of interacting with the AR experience or may flag the image target for later retrieval of the linked AR content. To help the user in making the decision, a snapshot of the original image target captured may be displayed by the HMD or on the mobile device connected to the body-worn camera to direct the user to the right target in the environment. The user may issue commands to the AR device via an HMD user interface or via the mobile device.

If the user decides to interact with the AR experience, the AR device may activate the camera to capture a full-resolution frame of the identified image target to allow the AR device to augment the AR content. For example, a full-resolution frame may enable additional AR content of the image target to be retrieved or may enable identification of additional image targets. In one embodiment, the AR device may capture the image target with a higher frame rate to enable real-time tracking of the image target. In one embodiment, the camera of the mobile device may perform AR content augmentation function by taking over real-time target tracking from the body-worn camera. A snapshot of the original image target captured may be displayed by the HMD or on the mobile device to help direct the user to the right target in the environment. If the user flags the image target for later retrieval of the linked AR content, the AR device may save the image target. When the user is ready for the AR experience at a later time, the snapshot of the original image target captured may be displayed to direct the user to the image target.

FIG. 1 shows a HMD or a body-worn camera connected to a mobile device used as a target-based AR device to scan image targets and display AR content according to one embodiment of the subject matter of the present disclosure. A mobile device 102 may be a smart phone (e.g., iPhone, Google phone, or other phones running Android, Window Mobile, or other operating systems), a tablet computer (e.g., iPad, Galaxy), personal digital assistant (PDA), a notebook computer, or various other types of wireless or wired computing devices. Mobile device 102 may communicate over a network 106 with HMD 104 or with a user-worn camera 108.

User-worn camera 108 may have an accelerometer and/or a gyro to track the body movement of a user wearing the camera. Mobile device 102 may poll the accelerometer and/or gyro at periodic intervals to detect movement patterns that may suggest that the user is viewing certain targets. Upon detecting such movement patterns, mobile device 102 may activate user-worn camera 108 to capture a low-resolution frame or several frames at a low-frame rate of targets in the user's field of view or the user's surrounding. User-worn camera 108 may transmit the images of targets to mobile device 102 through network 106. Mobile device 102 may run an AR target-matching algorithm on the images to preliminarily identify any image targets using a mobile device-based target database. In one or more embodiments, mobile device 102 may use a remote target database 110 or may transmit the images to a remote server for image target identification.

If an image target is preliminarily identified as having AR content, mobile device 102 may issue visual, audio or haptic alerts to alert the user that AR content for a target is available. In one or more embodiments, user-worn camera 108 may issue the audio or haptic alerts. Mobile device 102 may display a snapshot of the image target to direct the user to the target in the environment. Mobile device 102 may present options for the user to interact with the AR experience or to save the target for AR interaction at a later time. If the user decides to interact with the AR experience, such as to view the AR content, mobile device 102 may activate user-worn camera 108 to capture a full-resolution frame of the target or to capture the target at a high frame rate to enable real-time tracking of the target. In one or more embodiments, the camera of mobile device 102 may take over the real-time tracking from user-worn camera 108. In one or more embodiments, mobile device 102 may run the AR target-matching algorithm on the full-resolution frame using the target database to confirm the target, to augment the AR content, or to identify additional image targets.

If the user decides to save the target for AR interaction at a later time, mobile device 102 may save the snapshot of the image target. When the user is ready for the AR experience, mobile device 102 may display the snapshot of the image target. If the user is still in the vicinity of the target, the user may command mobile device 102 or user-worn camera 108 to capture a full-resolution frame of the target or to capture the target at a high frame rate to enable real-time tracking of the target. The user may interact with the AR experience as before. In one or more embodiments, even if the user is no longer in the vicinity of the target, the user may be able to retrieve AR content linked to the target for viewing.

An AR device may be a HMD 104. The functionalities of HMD 104 may be incorporated into a pair of glasses or a helmet worn by a user. In one or more embodiments, HMD 104 may provide the functionalities of user-worn camera 108 and mobile device 102. In this regard, HMD 104 may have an accelerometer and/or a gyro to track the head movement of a user, a camera to capture targets in the user's field of view, a display medium to display AR content to the user, and motion sensors or other sensing or input mechanism to detect or receive user commands. In one or more embodiments, HMD 104 with more limited capabilities may use mobile device 102 as a user interface to receive commands from the user via network 106.

As with an AR device that includes user-worn camera 108 and mobile device 102, HMD 104 may poll the accelerometer and/or gyro at periodic intervals to detect patterns of head movement suggesting that the user is viewing certain targets. HMD 104 may activate the embedded camera to perform a low power exploratory scan of images in the user's field of view. HMD 104 may run an AR target-matching algorithm on the scanned images using an internal target database or remote target database 110 to identify image targets. If an image target is preliminarily identified as having AR content, and if the accelerometer and/or gyro have not detected head movement exceeding a preset time or a head movement threshold since the camera was activated, HMD 104 may display an alert to the user that AR content for a target is available. HMD 104 may identify the target and may also display icons that the user may select to interact with the AR experience or to save the target for AR interaction at a later time.

If the user elects to interact with the AR experience, HMD 104 may activate the camera to perform a full resolution scan or to perform real-time tracking of the target. HMD 104 may run the AR target-matching algorithm on the full-resolution scanned image using the internal target database or remote target database 110 to confirm the target, to augment the AR content, or to identify additional image targets. If the user elects to save the image target, HMD 104 may save the snapshot of the image target. At a later time, the user may interact with the AR experience for the target as before.

Network 106 may be implemented as a single network or a combination of multiple networks. For example, in various embodiments, network 106 may include the Internet and/or one or more intranets, wireless networks (e.g., cellular, wide area network (WAN), WiFi hot spot, WiMax, personal area network (PAN), Bluetooth, etc.), landline networks and/or other appropriate types of communication networks. As such, in various embodiments, computing device 102 may be associated with a particular link (e.g., a link, such as a URL (Uniform Resource Locator) to an IP (Internet Protocol) address).

Figure 2A:
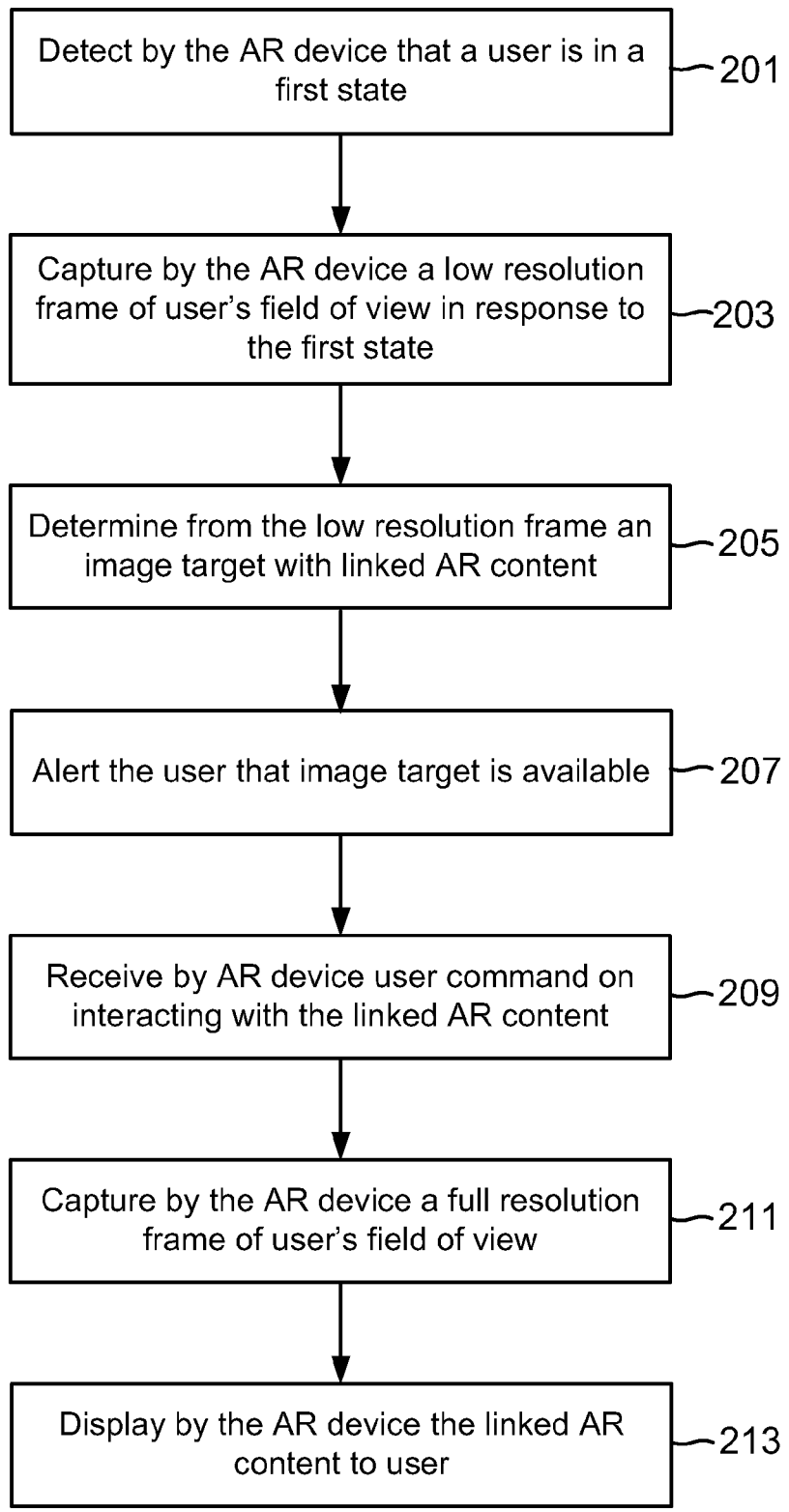
FIG. 2A shows the steps in a flowchart of a process for a target-based AR device to detect AR targets using low-power front-end passive scanning of targets according to one embodiment of the subject matter of the present disclosure.

FIG. 2A shows the steps in a flowchart of a process for a target-based AR device to detect AR targets using low-power front-end passive scanning of targets according to one embodiment of the subject matter of the present disclosure. In 201, an AR device detects that a user wearing the AR device is in a first state. For example, HMD 104 may poll the acceleration signatures from an accelerometer/gyro to detect a pause in the user's head movement after a period of motion.

In 203, the AR device captures a low resolution frame of the user's field of view in response to the detected first state. The low resolution frame may enable preliminary target identification without the processing and/or power penalties associated with capturing a full resolution frame. In 205, the AR device or an external device determines from the low resolution frame if an image target with linked AR content may be identified. For example, HMD 104 may run an AR target-matching algorithm using remote target database 110 to preliminarily identify any image targets with linked AR content.

In 207, if an image target with linked AR content is found, the AR device or an external device may alert the user that an image target is available. For example, HMD 104 may issue a visual alert that an image target has been found and may present options to the user allowing the user to request the linked AR content. In 209, the AR device receives a user command indicating whether the user wishes to interact with the linked AR content.

In 211, if the user command indicates that the user wishes to interact with the linked AR content, the AR device captures a full resolution frame of the user's field of view. The AR device may run the target-matching algorithm on the full resolution frame to confirm the target, to augment the AR content, or to identify additional image targets. In 213, the AR device displays the AR content linked to one or more identified image targets to the user.

Figure 2B:
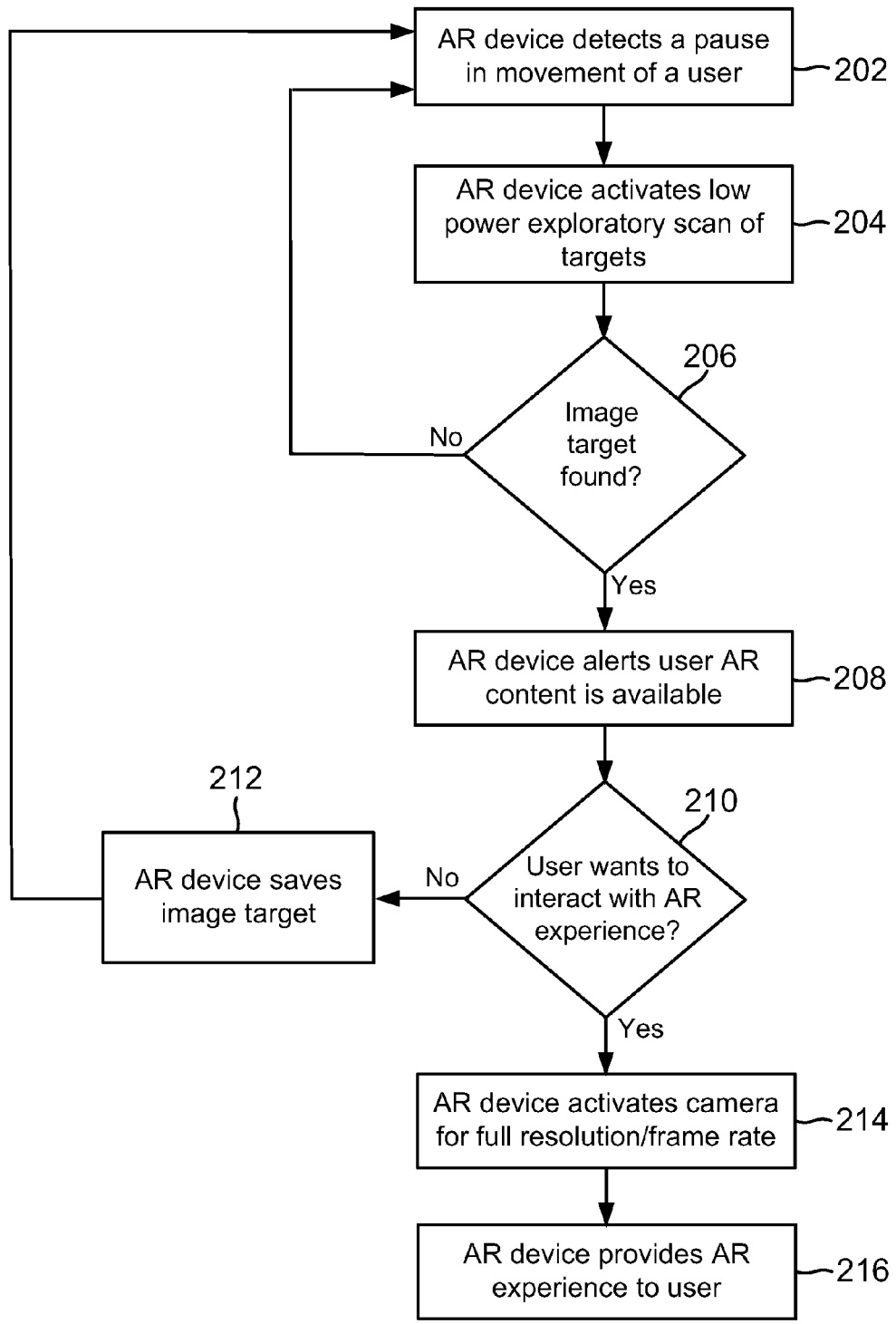
FIG. 2B shows the steps in a flowchart of a process for a target-based AR device to perform low-power front-end passive scanning of targets for image target identification according to one embodiment of the subject matter of the present disclosure.

FIG. 2B shows the steps in a flowchart of a process for a target-based AR device to perform low-power front-end passive scanning of targets for image target identification according to one embodiment of the subject matter of the present disclosure. FIG. 3 shows an exemplary field of view of a display of a HMD showing the availability of AR content for an image target according to one embodiment of the subject matter of the present disclosure. In the following discussion, FIG. 3 is considered in conjunction with FIG. 2 to illustrate an exemplary view of the display seen by a user wearing a HMD 104 that operates in accordance with the steps of FIG. 2.

In 202, an AR device such as HMD 104 detects a pause in the head movement of a user after a period of motion. Such a pattern of head movement suggests to HMD 104 that the user may be viewing or may be interested in certain targets. Referring to FIG. 3, HMD 104 has an accelerometer/gyro 304 that registers the acceleration experienced by HMD 104. HMD 104 may poll accelerometer/gyro 304 at periodic intervals such as every few seconds to detect the head motion of the user. When accelerometer/gyro 304 registers an initial period of motion followed by no significant head movement across several polling intervals, HMD 104 may deduce that an object within a field of view 306 of the user has caught the user's interest. In one or more embodiments, HMD 104 may employ eye tracking to narrow down a region of field of view 306 encompassing the interested object.

For example, the user may be shopping at a TV department of an electronics store. HMD 104 may detect a period of head motion as the user moves his or her head casually to scan the selection of TVs on display. When the user sets his eyes on a particular TV 308 for a few seconds, HMD 104 detects a pause in the user's head movement following the period of head motion.

Referring back to 204 of FIG. 2, the AR device activates a camera to perform a low power exploratory scan of targets within the user's field of view. The AR device may activate the camera to capture a single low-resolution frame of targets or several frames at a low-frame rate of targets in the user's field of view 306. In one or more embodiments, when a smaller region of the user's field of view 306 encompasses the object being viewed by the user, the AR device may perform the exploratory scan over only that region. In one or more embodiments, the camera performs the exploratory scan over the user's full field of view to help identify image targets the users may be unknowingly viewing.

In 206, the AR device runs an AR target-matching algorithm using a target database on the frame or frames to identify any image targets. The target database may reside within the AR device. In one or more embodiments, the AR device may transmit the frame or frames to a remote server for the remote server to identify image targets using a remote target database. The AR device or the remote server may perform target-matching using text recognition, pattern matching, facial recognition, or other techniques to correlate images of captured objects with image targets in the target database.

If the target-matching algorithm does not identify any target within the current field of view, the AR device may returns to 202 to periodically monitor the user's movement patterns to initiate scans of other fields of view. For example, HMD 104 may poll accelerometer/gyro 304 to detect renewed head motion after the period during which the last exploratory scan was performed. HMD 104 may then restart the search for patterns of head movement that could suggest that the user may be viewing or may be interested in additional objects.

If the target-matching algorithm identifies one or more targets, the AR device may detect if there has been significant movement of the user since the AR activated the camera for the exploratory scan. If there has been significant user movement since the exploratory scan, indicating that the user may no longer be viewing the object, the AR device returns to 202 to detect if the user may be viewing other objects.

In 208, if there has been no significant user movement, suggesting that the user may still be viewing the object that initially caught the user's attention, the AR device alerts the user that AR content is available. The AR device may identify to the user the one or more targets for which AR content is available. For example, the AR device may present a snapshot of the targets or may present informational display to help the user identify the targets. In 210, the AR device may present for each target options for the user to interact with the linked AR content or for the user to save the target for later retrieval of the linked AR content.

For example, in FIG. 3, HMD 104 activates a camera 302 to capture a low-resolution frame of field of view 306 of the user. Field of view 306 encompasses TV 308 and other objects. HMD 104 may run a target-matching algorithm on objects in the captured frame to identify targets the user may be knowingly or unknowingly viewing in field of view 306. For example, the target-matching algorithm reads the tag on the console of TV 308 to decode the brand name and model name of TV 308. The target-matching algorithm finds an image target for a TV matching the brand name and model name.

HMD 104 polls accelerometer/gyro 304 to verify that there has been no significant head movement since camera 302 performed the exploratory scan, indicating that the user is still viewing TV 308 or other objects within field of view 306. HMD 104 displays a pop up window 310 informing the user that AR content for TV 308 is available. HMD 104 may position pop up window 310 close to TV 308 to help direct the user's attention to TV 308. Within pop up window 310 there are displayed two icons—a first icon 312 that the user may select to view the linked AR content of TV 308, and a second icon 314 that the user may select to save the image target for TV 308 for later retrieval of the linked AR content. If the target-matching algorithm identifies additional targets within field of view 306, HMD 104 may similarly display a pop up window identifying the targets for which AR contents are available and may offer the user the choices to interact with the AR experience or to save the targets.

Referring back to FIG. 2, in 212 if the user chooses to save the image target for later retrieval, the AR device saves the image target in memory. When the user is ready for the AR experience at a later time, the AR device may display the snapshot of the original image target to direct the user's attention to the image target. The AR device returns to 202 to restart the search for patterns of head movement suggesting that the user may be viewing or may be interested in additional objects.

In 214, if the user chooses to interact with the AR experience, the AR device activates the camera to capture a full-resolution frame of the target to allow the AR device to augment the AR content. In one or more embodiments, the AR device may activate the camera to capture the target at a high frame rate to enable real-time tracking of the target. In 216, the AR device provides the linked AR content to the user to allow the user to interact with the AR content for the target. In one or more embodiments, the AR device may run the AR target-matching algorithm on the full-resolution frame using the target database to confirm the target, to augment the AR content, or to identify additional image targets.

For example, in FIG. 3, if the user chooses to interact with the AR content for TV 308, the user may select first icon 312. HMD 104 may detect the user's selection by sensing the user's finger movement over first icon 312 or through other sensing or input mechanisms. HMD 104 may activate camera 302 to capture a full-resolution frame of TV 308 to allow HMD 104 to augment the AR content. HMD 104 may display the augmented AR content of TV 308 to user. The augmented AR content may include information on TV 308 such as its features, price, reviews, discounts, comparisons with other similar products, etc.

If the user chooses to save the AR content, the user may select second icon 314. HMD 104 may save the AR content of TV 308 for later retrieval by the user, allowing the user to interact with the AR content even when the TV 308 is no longer in field of view 306. In one or more embodiments, HMD 104 may poll accelerometer/gyro 304 to determine if there has been significant head motion since pop up window 310 was displayed. If there has been significant head motion, indicating that the user may no longer be viewing TV 308, HMD 104 may close pop up window 310.

Figure 4:
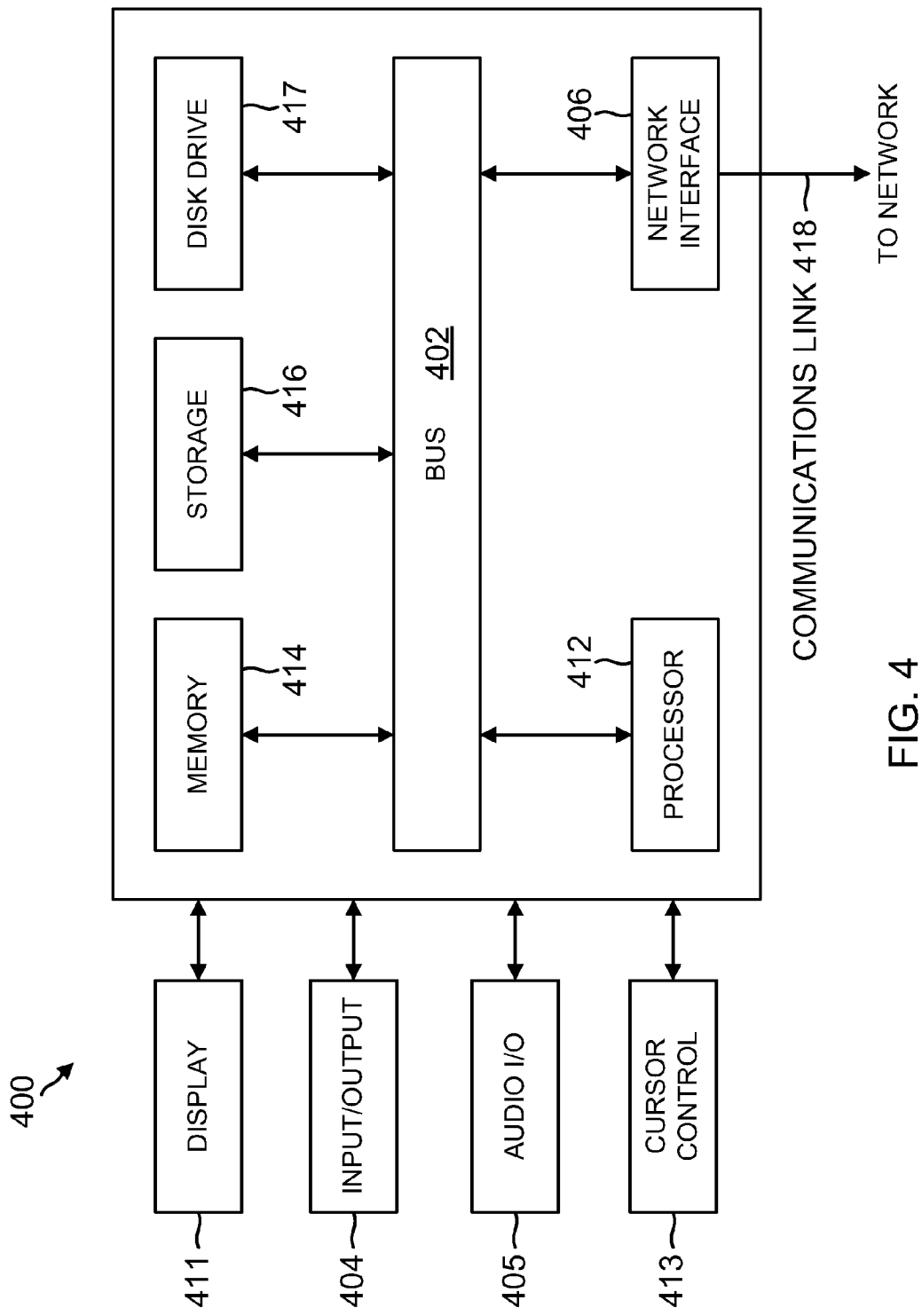
FIG. 4 is a block diagram of a computer system suitable for implementing one or more components discussed herein according to one embodiment of the subject matter of the present disclosure.

FIG. 4 is a block diagram of a computer system 400 suitable for implementing one or more components discussed herein according to one embodiment of the subject matter of the present disclosure. In various implementations, mobile device 102 of the user may comprise a personal computing device (e.g., smart phone, a computing tablet, a personal computer, laptop, PDA, Bluetooth device, key FOB, badge, etc.) capable of communicating with the network. Similarly, HMD 104 may comprise a personal computing device incorporated into a pair of glasses or a helmet. HMD 104 may comprise or implement a plurality of hardware components and/or software components that operate to perform various methodologies in accordance with the described embodiments. Exemplary HMD 104 may include, for example, stand-alone and networked computers running mobile OS.

Computer system 400 includes a bus 402 or other communication mechanism for communicating information data, signals, and information between various components of computer system 400. Components include an input/output (I/O) component 404 that processes a user action, such as selecting keys from a virtual keypad/keyboard, selecting one or more buttons or links, etc., and sends a corresponding signal to bus 402. I/O component 404 may also include an output component such as a display medium 411 mounted a short distance in front of the user's eyes, and an input control such as a cursor control 413 (such as a virtual keyboard, virtual keypad, virtual mouse, etc.). An optional audio input/output component 405 may also be included to allow a user to use voice for inputting information by converting audio signals into information signals. Audio I/O component 405 may allow the user to hear audio. A transceiver or network interface 406 transmits and receives signals between computer system 400 and other devices, such as another user device, or another network computing device via a communication link 418 to a network. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical, or magnetic disks, or solid-state drives; volatile media includes dynamic memory, such as system memory component 414; and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, firmware, or combinations thereof. Also where applicable, the various hardware components, software components, and/or firmware components set forth herein may be combined into composite components comprising software, firmware, hardware, and/or all without departing from the spirit of the present disclosure. Where applicable, the various hardware components, software components, and/or firmware components set forth herein may be separated into sub-components comprising software, firmware, hardware, or all without departing from the spirit of the present disclosure. In addition, where applicable, it is contemplated that software components may be implemented as hardware components, and vice-versa. Where applicable, the ordering of various steps described herein may be changed, combined into composite steps, and/or separated into sub-steps to provide features described herein.

Although embodiments of the present disclosure have been described, these embodiments illustrate but do not limit the disclosure. For example, although activation of the low-power exploratory scanning by AR devices is illustrated by detecting a pause in a user's body movement after a period of motion, other movement patterns may be used to activate the exploratory scan. Similarly, sensors other than accelerometers or gyros, such as retinal scanners may be used to refine the activation of the exploratory scan to further reduce power. It should also be understood that embodiments of the present disclosure should not be limited to these embodiments but that numerous modifications and variations may be made by one of ordinary skill in the art in accordance with the principles of the present disclosure and be included within the spirit and scope of the present disclosure as hereinafter claimed.

What is claimed is:

1. A method for interacting with a user wearing an augmented reality (AR) device, comprising:
   detecting by the AR device that the user is in a first state;
   capturing by the AR device a low resolution frame of a field of view of the user in response to said detecting of the first state;
   determining from the low resolution frame an image target, wherein the image target has a linked AR content;
   alerting the user that the image target is available;
   receiving by the AR device a command from the user on whether to interact with the linked AR content;

capturing by the AR device a full resolution frame of the field of view of the user based on the command indicating that the user wants to interact with the linked AR content; and displaying by the AR device the linked AR content to the user.

2. The method of claim 1, wherein said detecting by the AR device that the user is in the first state comprises detecting a movement pattern of the user wearing the AR device.

3. The method of claim 2, wherein the movement pattern comprises a first period of movement followed by a second period of pause in motion.

4. The method of claim 1, wherein said capturing by the AR device the low resolution frame of the field of view of the user comprises capturing a plurality of frames of the field of view at a low frame rate.

5. The method of claim 1, wherein said determining from the low resolution frame the image target comprises running an AR target-matching algorithm on the low resolution frame to identify the image target from a target database.

6. The method of claim 5, where said running of the AR target-matching algorithm is by a remote server in communication with the AR device.

7. The method of claim 1, wherein said alerting the user that the image target is available comprises displaying visually by the AR device information on availability of the image target.

8. The method of claim 1, wherein said alerting the user that the image target is available comprises determining that the user remains in the first state after said capturing by the AR device of the low resolution frame of the field of view of the user.

9. The method of claim 1, further comprising saving the image target based on the command indicating that the user wants to interact with the linked AR content at a later time.

10. The method of claim 1, wherein said capturing by the AR device the full resolution frame of the field of view of the user comprises tracking the image target using the full resolution frame.

11. The method of claim 1, wherein said capturing by the AR device the full resolution frame of the field of view of the user comprises augmenting the linked AR content.

12. The method of claim 1, further comprising determining from the full resolution frame of the field of view of the user one or more additional image targets, wherein the one or more additional image targets have linked AR content.

13. The method of claim 1, wherein the AR device comprises a head mounted display (HMD).

14. The method of claim 1, wherein the AR device comprises a mobile device and a first camera worn by the user, wherein the first camera is used for capturing the low resolution frame of the field of view of the user.

15. The method of claim 14, wherein the mobile device comprises a second camera, wherein the second camera is used for capturing the full resolution frame of the field of view of the user.

16. An apparatus, comprising:
a sensor configured to register a motion of the apparatus;
a camera;
a memory; and
one or more processors coupled to the memory and configured to:
poll the sensor to detect a movement pattern of the apparatus;
activate the camera to capture a low resolution frame of a field of view of the camera in response to the movement pattern;

determine from the low resolution frame an image target, wherein the image target has a linked augmented reality (AR) content;
generate an alert to indicate that the image target is available;
receive a command for the linked AR content; and
activate the camera to capture a full resolution frame of the field of view of the camera based on the command for the linked AR content.

17. The apparatus of claim 16, further comprising a display medium, and wherein the one or more processors are further configured to display the linked AR content on the display medium.

18. The apparatus of claim 16, wherein the movement pattern comprises a first period of movement followed by a second period of pause in motion.

19. The apparatus of claim 16, wherein the low resolution frame of the field of view of the camera comprises a plurality of frames of the field of view of the camera at a low frame rate.

20. The apparatus of claim 16, wherein the one or more processors are configured to determine from the low resolution frame the image target by being further configured to run an AR target-matching algorithm on the low resolution frame to identify the image target from a target database.

21. The apparatus of claim 16, wherein the one or more processors are configured to generate the alert to indicate that the image target is available by being further configured to display on a display medium information on availability of the image target.

22. The apparatus of claim 16, wherein the one or more processors are configured to generate the alert to indicate that the image target is available by being further configured to poll the sensor to determine that the sensor registers no motion of the apparatus that exceeds a motion threshold after the one or more processors are configured to activate the camera to capture the low resolution frame of the field of view of the camera.

23. The apparatus of claim 16, wherein the one or more processors are further configured to save the image target based on the command comprising a request to provide the linked AR content at a later time.

24. The apparatus of claim 16, wherein the one or more processors are configured to activate the camera to capture the full resolution frame of the field of view of the camera by being further configured to track the image target using the full resolution frame of the field of view of the camera.

25. The apparatus of claim 16, wherein the one or more processors are further configured to augment the linked AR content from the full resolution frame of the field of view of the camera.

26. The apparatus of claim 16, wherein the one or more processors are further configured to determine from the full resolution frame of the field of view of the camera one or more additional image targets, wherein the one or more additional image targets have linked AR content.

27. The apparatus of claim 16, wherein the apparatus comprises a head mounted display (HMD).

28. A non-transitory machine-readable medium comprising a plurality of machine-readable instructions which, when executed by one or more processors, are adapted to cause the one or more processors to perform a method comprising:
detecting that a user is in a first state;
capturing a low resolution frame of a field of view of the user in response to said detecting of the first state;
determining from the low resolution frame an image target, wherein the image target has a linked augmented reality (AR) content;

alerting the user that the image target is available;
receiving a command for the linked AR content;
capturing a full resolution frame of the field of view of the user based on the command for the linked AR content; and
providing the linked AR content to the user.

29. The non-transitory machine-readable medium of claim 28, wherein said detecting that the user is in the first state comprises detecting a movement pattern of the user.

30. The non-transitory machine-readable medium of claim 29, wherein the movement pattern comprises a first period of movement followed by a second period of pause in motion.

31. The non-transitory machine-readable medium of claim 28, wherein said capturing the low resolution frame of the field of view of the user comprises capturing a plurality of frames of the field of view at a low frame rate.

32. The non-transitory machine-readable medium of claim 28, wherein said determining from the low resolution frame the image target comprises running an AR target-matching algorithm on the low resolution frame to identify the image target from a target database.

33. The non-transitory machine-readable medium of claim 28, wherein said alerting the user that the image target is available comprises displaying visually information on availability of the image target.

34. The non-transitory machine-readable medium of claim 28, wherein said alerting the user that the image target is available comprises determining that the user remains in the first state after said capturing the low resolution frame of the field of view of the user.

35. The non-transitory machine-readable medium of claim 28, wherein the method further comprises saving the image target based on the command indicating that the user wants to interact with the linked AR content at a later time.

36. The non-transitory machine-readable medium of claim 28, wherein said capturing the full resolution frame of the field of view of the user comprises tracking the image target using the full resolution frame.

37. The non-transitory machine-readable medium of claim 28, wherein the method further comprises augmenting the linked AR content using the full resolution frame of the field of view of the user.

38. The non-transitory machine-readable medium of claim 28, wherein the method further comprises determining from the full resolution frame of the field of view of the user one or more additional image targets, wherein the one or more additional image targets have t linked AR content.

39. A system comprising:
means for detecting that a user is in a first state;
means for capturing a low resolution frame of a field of view of the user in response to said detecting of the first state;
means for determining from the low resolution frame an image target, wherein the image target has a linked augmented reality (AR) content;
means for alerting the user that the image target is available;
means for receiving a command for the linked AR content;
means for capturing a full resolution frame of the field of view of the user based on the command for the linked AR content; and
means for providing the linked AR content to the user.

40. The system of claim 39, wherein the means for detecting that the user is in the first state comprises means for detecting a movement pattern of the user.

41. The system of claim 40, wherein the movement pattern comprises a first period of movement followed by a second period of pause in motion.

42. The system of claim 39, wherein the means for capturing the low resolution frame of the field of view of the user comprises means for capturing a plurality of frames of the field of view at a low frame rate.

43. The system of claim 39, wherein the means for determining from the low resolution frame the image target comprises means for running an AR target-matching algorithm on the low resolution frame to identify the image target from a target database.

44. The system of claim 39, wherein the means for alerting the user that the image target is available comprises means for displaying visually information on availability of the image target.

45. The system of claim 39, wherein the means for alerting the user that the image target is available comprises means for determining that the user remains in the first state after said capturing of the low resolution frame of the field of view of the user.

46. The system of claim 39, further comprising means for saving the image target based on the command indicating that the user wants to interact with the linked AR content at a later time.

47. The system of claim 39, wherein the means for capturing the full resolution frame of the field of view of the user comprises means for tracking the image target using the full resolution frame.

48. The system of claim 39, further comprising means for augmenting the linked AR content using the full resolution frame of the field of view of the user.

49. The system of claim 39, further comprising means for determining from the full resolution frame of the field of view of the user one or more additional image targets, wherein the one or more additional image targets have linked AR content.

* * * * *